United States Patent [19]
Kensky

[11] Patent Number: 5,301,347
[45] Date of Patent: Apr. 5, 1994

[54] MULTI-SYSTEM LASER SAFETY SHUTTER CONTROLLER

[75] Inventor: E. Thomas Kensky, Miamisburg, Ohio

[73] Assignee: The United States of America as represented by the Secretary of the Air Force, Washington, D.C.

[21] Appl. No.: 785,594

[22] Filed: Oct. 30, 1991

[51] Int. Cl.$^5$ ............................................. G06F 15/20
[52] U.S. Cl. .............................. 395/800; 364/DIG. 2; 364/924.4; 364/926.9
[58] Field of Search ....................... 364/474.08, 474.19; 250/205, 347; 395/275, 800

[56] References Cited
U.S. PATENT DOCUMENTS

| | | | |
|---|---|---|---|
| 4,415,231 | 11/1983 | Kaczensky et al. | 350/269 |
| 4,663,520 | 5/1987 | Tanaka et al. | 250/205 |
| 4,730,113 | 3/1988 | Edwards et al. | 250/347 |
| 4,856,874 | 8/1989 | Tusting | 350/269 |

*Primary Examiner*—Thomas M. Heckler
*Attorney, Agent, or Firm*—Bernard E. Franz; Donald J. Singer

[57] ABSTRACT

The controller is microprocessor based, and provides an interface between laboratory entrances and accompanying safety shutters to block the laser beam during a laboratory breach. The shutter controller comprises a microcomputer operating in a two data bus configuration. Communication to external safety devices is accomplished through three output ports and one input port. Interface cards signal the system that an action is to be taken. In operation, the controller performs a set of very specific tasks which form the controller algorithm. When the controller receives an interrupt indicating that the laboratory was breached, the controller directs that all shutters on all lasers are closed. Output ports serve as drivers for safety shutters, interlocks, and indicator lights to convey the status of the safety shutters. An input port accepts input data from an external driver that indicates the actual state of the shutters to determine if a shutter closure failure occurred. Interface to the shutter controller system is accomplished through the use of interface cards, which perform the dual function of signalling the system that an action is to be taken and indicating the specific nature of the requested action. The cards allow the user to control the shutters and/or interlocks of each laser connected to the system via the use of switches, remote controls and computer interfaces. It is through the use of the second data bus that these cards communicate with the microcomputer.

7 Claims, 7 Drawing Sheets

MULTI-SYSTEM LASER SAFETY SHUTTER CONTROLLER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a multi-system laser safety shutter controller.

In the modern laboratory environment, the laser has become commonplace. From materials research and testing to communications and optical computing, lasers have proven to be valuable tools for research. Along with this usefulness, lasers pose an inherent safety hazard. One immediately thinks of burns as the primary hazard of laser operation; however, this is not the case. A more important concern is the ability of laser light to blind an unsuspecting individual. Surprisingly low intensity levels of laser radiation can cause permanent vision loss before the human eye can react. For this reason, vision safety should be of paramount importance in a laser environment.

The foremost method of vision protection from laser radiation is the use of safety goggles. Goggles with filters for blocking laser light at various wavelengths are available from a multitude of manufacturers. If chosen and worn properly, they provide adequate protection to those working with lasers while still allowing adequate visual perception to perform normal laboratory functions.

While safety goggles provide protection to announced visitors or those individuals who regularly work with lasers, the unexpected guest is still at extreme risk. To provide protection to these individuals, most lasers incorporate an interlock mechanism that shuts the laser down during an unexpected breach of the laser work area. Usually, a switch of some sort is connected to the entrance doors of the laboratory that activates the interlock. However, while this type of mechanism is extremely useful in a secure laboratory, it may not be well suited for a more "heavily travelled" lab. This is because most interlock mechanisms operate by shutting down the laser power supply. Doing this requires that the laser be restarted after each shutdown. This situation is very inconvenient and may be damaging to the laser. An alternative to this system is a safety shutter.

A safety shutter functions by blocking the laser beam when a laboratory intrusion occurs. This is more convenient than the interlock mechanism, and it produces no strain on the laser system. The safety shutter can be controlled the same as an interlock, and it provides a convenient means of stopping the laser beam when the rearrangement of an experiment is required.

The following United States patents relate to various safety devices for lasers.

U.S. Pat. No. 4,856,874—Tusting
U.S. Pat. No. 4,730,113—Edwards et al
U.S. Pat. No. 4,663,520—Tanaka et al
U.S. Pat. No. 4,415,231—Kaczensky et al The Tusting patent describes a safety device for submarine lasers. The laser is enclosed in a water-proof housing with a window portion. The laser device emits coherent light through the window only when the laser device is immersed in water. Shutter means prevents coherent light from being emitted through the window unless the laser device is immersed in water. The shutter means can be activated by a pressure switch, shutter float, or some similar device. The Edwards et al patent relates to a safety system for a laser-utility facility. The system comprises a safety enclosure and an infra-red monitoring system. The monitoring system detects hot spots at internal surfaces of the enclosure walls. Detection of a hot spot leads to shutting of the laser source or interrupting the laser beam by means of a shutter. The Tanaka et al patent describes a fail-safe laser apparatus in which a laser beam radiation source emits a laser beam along an optical axis. The apparatus comprises a main shutter, a safety shutter, a first and second sensor, and a detection circuit. The first sensor produces a first signal indicative of the intensity of the laser beam between the source and the main shutter, and the second sensor produces a second signal which is indicative of the intensity of the laser beam between the main shutter and the safety shutter. A detection circuit is responsive to any excessive laser beam energy indicated by the sensor signals, and manipulates the safety shutter accordingly. The Kaczensky et al patent relates to a radiation shutter which prevents laser radiation from exiting the source. Two filter and/or diaphragm systems are individually switchable into the radiation path in series fashion. Each system has an actuator for positioning the respective radiation stopping system in response to a control signal provided by a sensor of the respective previous system.

SUMMARY OF THE INVENTION

An objective of the invention is to provide improved safety from hazards involved with laser usage in laboratories.

The invention relates to a system which is microprocessor based, and provides an interface between laboratory entrances and accompanying safety shutters to block the laser beam during a laboratory breach. The shutter controller comprises a microcomputer operating in a two data bus configuration. Communication to external safety devices is accomplished through three output ports and one input port. Interface cards signal the system that an action is to be taken. In operation, the controller performs a set of very specific tasks which form the controller algorithm. When the controller receives an interrupt indicating that the laboratory was breached, the controller directs that all shutters on all lasers are closed.

The shutter controller is designed around the Motorola MC6802 8-bit microprocessor. The system has 2048 bytes of erasable programmable read-only memory (EPROM) for system program and operating instructions and 128 bytes of random access memory (RAM) internal to the MC6802 for stack operations and temporary storage. The shutter controller operates in a two data bus configuration with one bus serving the microcomputer and the other bus acting as a gateway for data from peripheral devices.

For communication to external safety devices, the system uses three 8-bit output ports and an 8-bit input port. Two of the output ports serve as drivers for safety shutters and interlocks, and the third port drives indicator lights to convey the status of the safety shutters to the user. The input port accepts input data from an external driver that indicates the actual state of the shutters so comparison can be made to the expected state. The data from this input port are used primarily to determine if a shutter closure failure occurred.

User interface to the shutter controller system is accomplished through the use of interface cards. These cards, called slot cards, perform the dual function of signalling the system that an action is to be taken and indicating the specific nature of the requested action. The cards allow the user to control the shutters and/or interlocks of each laser connected to the system via the use of switches, remote controls and computer interfaces. It is through the use of the second data bus that these cards communicate with the microcomputer.

The controller operates through an interrupting scheme. All actions to be taken by the controller are initiated by an interrupt of some sort. In the case of a laboratory breach, the interrupt service has highest priority and is non-maskable. In other words, the system has no means of ignoring a breach interrupt. This provides maximum protection in case of emergency. This type of interrupt will take precedence over all other activities of the system with the exception of a hardware reset.

The other type of interrupt received by the controller is from the interface cards. This interrupt operates on a pseudo-priority basis and is maskable. For this case, any interface card can signal the system for service, but the signal can be ignored when an emergency interrupt (i.e. non-maskable) arises.

The service scheme for the slot cards is somewhat unique. Any card in any slot of the system can cause an interrupt, but once recognized, the system will temporarily ignore all others. The system then searches the slots in ascending order to determine which card sent the interrupt. Once the interrupting card has been found and serviced, the interrupt is cleared and any other outstanding interrupts can be serviced. If two cards send interrupt requests simultaneously, the card with the lowest slot address will be serviced first.

The shutter control system has been designed to handle up to eight laser shutters and interlocks. In addition, the slot cards have been designed to allow control of any shutter or interlock by simply changing its command code. This design gives maximum flexibility to the user for customizing to a particular need and also allows for change when the user's needs change.

DETAILED DESCRIPTION

Figure 1:
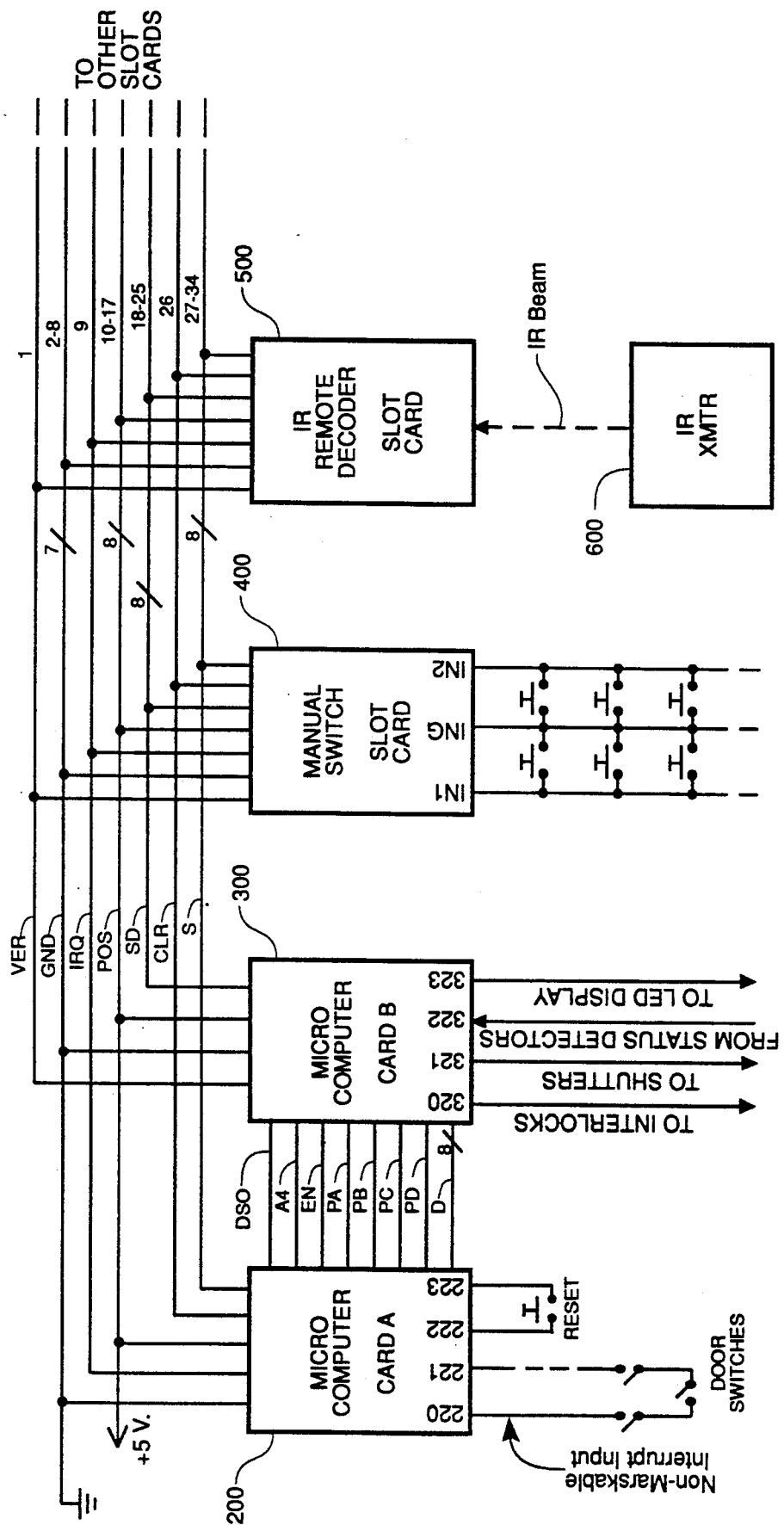
FIG. 1 is a block diagram showing the printed circuit cards used in a laser safety shutter controller.

The system is disclosed in a technical report WRDC-TR-90-4102 titled "Multi-System Laser Safety Shutter Controller, by E. Thomas Kensky, Materials Laboratory, Wright Research and Development Center (now Materials Directorate of Wright Laboratories), Air Force Systems Command, Wright-Patterson Air Force Base, Ohio 45433-6533, a copy of which is attached hereto and is hereby incorporated by reference.

SHUTTER CONTROLLER OPERATION ALGORITHM SPECIFICS

When in operation, the shutter controller performs a set of very specific tasks. These tasks form the operation algorithm and are separated into three types. The first task performs initialization to the system. The other two tasks service interrupts. The first answers laboratory breach requests, and the other answers user convenience requests.

The initialization task is initiated in one of three ways. It occurs during power-up, upon hardware reset or upon receiving a reset command from a slot card. In all cases, during initialization the controller performs the following set of tasks. The system first disables any convenience requests, then closes all shutters and interlocks and finally updates the shutter indicator lights. The result is to enable all lasers and block all beams. The controller then resets all slot cards and enables convenience interrupts. Upon completion of these tasks, the controller enters a wait state.

When the controller receives an interrupt indicating that the laboratory was breached the first action to be performed, after disabling convenience interrupts, is to close all shutters on all lasers. The controller then enters a delay routine to allow the shutters sufficient time to close and settle. The state of these shutters is then read, and if they were all found to be closed, the controller begins a polling routine of the entrance to the laboratory where the breach occurred. If the controller determined that the shutters did not all close (i.e. a malfunction) it immediately opens all interlocks and subsequently turns off all lasers. It should be noted that even under these circumstances, the breached laboratory entrance is monitored. No further action can be taken to affect either shutters or interlocks until the breach to the laboratory is secured. Once it has been secured, the controller returns to a wait state.

The third type of task performed by the controller is servicing user convenience interrupts. These are sent by the slot cards and are primarily used to open or close shutters and interlocks for the convenience of the laser operator. The operations performed in this routine are more involved than those of the previous routines. After postponing further convenience interrupts, the controller polls the slot cards to determine which one is requesting service. Once this has been determined, the controller reads an 8-bit command byte from the interrupting slot card. This byte is put through a series of tests to determine if it is valid, and if so then the appropriate action is taken. If the byte was invalid, the slot card is reset and the controller returns to a wait state. It should be noted that the convenience service routine will be aborted during execution if a lab breach interrupt is received.

The specific action to be taken by the controller is dictated by the code sent by the slot card. This code can cause any one of 37 actions to be taken. Five of these actions are global in nature in that they affect more than one shutter or interlock at a time. The most global command is the reset command. This command causes a total reset of the system. The other four global commands either open all shutters or interlocks (two separate codes) or close all shutters or interlocks (two separate codes).

The remaining 32 codes that can be sent by a slot card are used to open or close individual shutters or interlocks. The controller acts upon these codes by interpreting them as offset addresses to an action table contained in the EPROM. The controller uses this offset address to obtain a byte of information from the action table. This is then used in conjunction with the present state of the shutters or interlocks to effect the appropriate change.

The hardware design in conjunction with the operating algorithm provides for an effective shutter control system. Both safety and convenience issues of users dealing with exposed-beam laser systems is addressed. In addition, a great deal of flexibility is inherent to the system providing open-ended control and expandability to meet present and future needs of laser laboratories.

SYSTEM DESCRIPTION

The laser shutter controller's hardware is separated into two categories. The first is a microcomputer comprising the microprocessor and its associated circuitry. The second is the slot cards.

As shown in FIG. 1, the shutter controller uses a microcomputer, comprising two printed circuit cards, 200 and 300 (cards A and B). There are a plurality of slot cards which are peripheral devices, including a manual switch slot card 400 and an infrared remote decoder slot card 500. An infrared transmitter 600 is used to send commands to the IR decoder card 500.

All of the cards have 34-pin edge connectors, which connect to backplane wiring shown at the top of FIG. 1. The first lead VER (pin 1) is used for an interrupt verify signal from the slot cards. Seven leads GND (pins 2-8) are in parallel connected to ground. Lead IRQ (pin 9) is for an interrupt signal from the slot cards. Eight leads POS (pins 10-17) are in parallel connected to a positive 5-volt power source. Eight leads SD (pins 18-25) are the data lines from the slot cards. Lead CLR (pin 26) is used to clear the slot card interrupt signal. Eight leads S (pins 27-34) form the slot card interrupt bus.

THE MICROCOMPUTER

Figure 2:
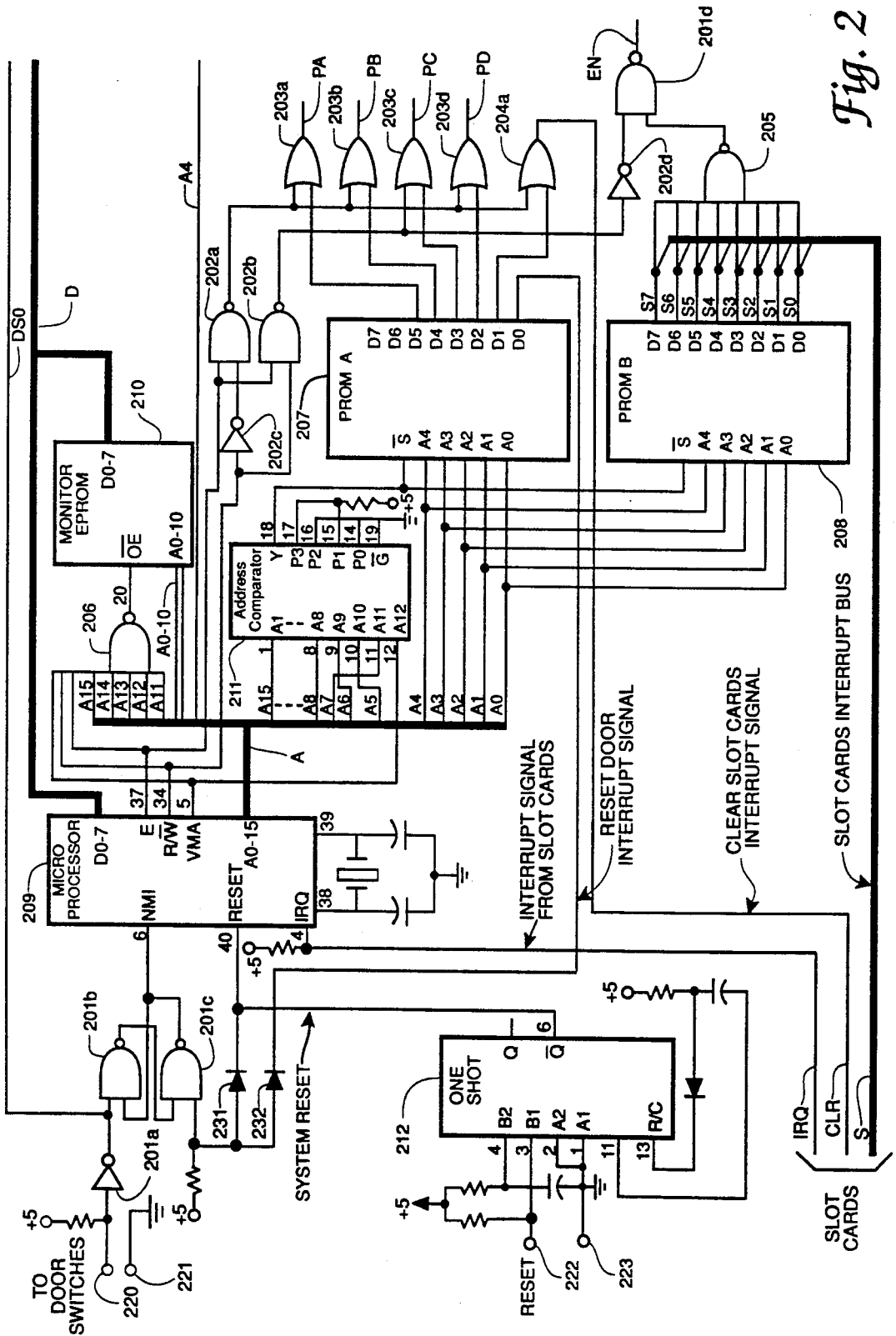
FIGS. 2 and 3 are functional block and schematic diagrams of two cards forming a micro-processor.
Figure 3:
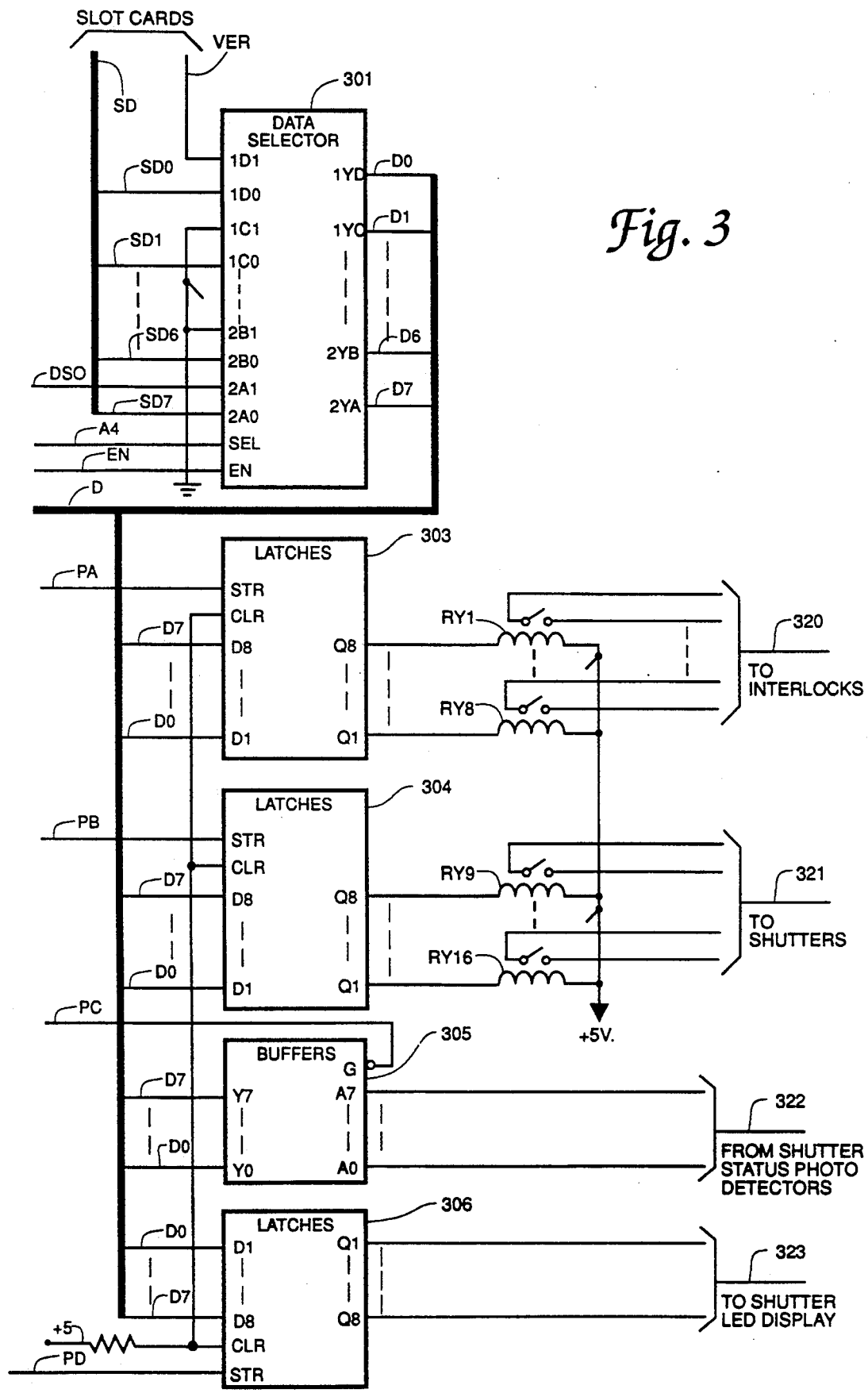

A diagram of the microcomputer circuitry on cards 200 and 300 is shown in FIGS. 2 and 3. These cards are interconnected via a DIP jumper comprising the eight leads of bus D, the address line A4, and leads DSO, EN, PA, PB, PC and PD. The heart of the controller is the Motorola MC6802 8-bit microprocessor 209. The system has 2048 bytes of erasable programmable read-only memory in a monitor EPROM 210 for system program and operating instructions and 128 bytes of random access memory (RAM) internal to the MC6802 for stack operations and temporary storage. The shutter controller operates in a two data bus configuration with one bus D serving the microcomputer and the other bus SD acting as a gateway for data from peripheral devices, these busses being coupled via a data selector 301. A 16-bit address bus A couples the microprocessor 209 to the EPROM 210 and to address decoding circuits comprising an address comparator 211 and PROM devices 207 and 208.

For communication to external safety devices, the system uses three 8-bit output ports (latches) and an 8-bit input port (buffers). Two of the output ports 303 and 304 serve as drivers for interlocks and safety shutters, and the third port 306 drives indicator lights to convey the status of the safety shutters to the user. The input port 305 accepts input data from an external driver that indicates the actual state of the shutters so comparison can be made to the expected state. The data from this input port are used primarily to determine if a shutter closure failure occurred.

As configured in the laser shutter controller, the microprocessor 209 has three input control lines that directly affect system operation. The first is the reset pin 40. Driving this control line low will immediately cause the microprocessor to internally initialize and then execute the initialization program to reset the rest of the system. Reset is executed automatically on power-up and can be initiated manually when required. The second and third control lines are the external interrupts. The first is the non-maskable interrupt NMI, and it is initiated by breaches to the laboratory environment. The second is the maskable interrupt IRQ and it is initiated by the slot cards when service is required.

The microprocessor 209 has internal clock circuitry. It requires only the addition of an external crystal and two netting capacitors coupled to pins 38 and 39.

THE SYSTEM BUS STRUCTURE

The laser shutter controller has a three bus architecture. The microprocessor communicates to all devices using a 16-bit address bus A, and two 8-bit data buses D and SD. The address bus A and the data bus D are interfaced directly to the microprocessor 209, and are used for addressing, communication and data transfer between devices. The second data bus SD is buffered from the first data bus D and is used for data transfer to the slot cards.

The microprocessor data bus D is an 8-bit parallel bus that connects to the I/O ports in FIG. 3, the system software EPROM 210 and the buffer circuit 301 to the slot cards. All information passed to and from the various elements of the laser shutter controller travels over this bus. The data transfer on the bus D is synchronized with the E clock signal, the cycle time for data bus transfers being one period of the E clock. The information on the data bus D becomes available during a read or write operation during the high portion of the E Clock. Latching on the data bus occurs on the falling edge of the E clock.

When interfacing to the slot card buffers of the I/O ports, the data bus D functions bidirectionally. Operation instructions can be received from the slot cards over the data bus as can laser shutter status information from one of the I/O ports 305. Write operations from the microprocessor over the data bus include opening and closing shutters, resetting slot cards and changing the state of the laser status indicator lights. The data bus D also serves to transport the system software instructions to the microprocessor 209. As opposed to the I/O ports, data bus operations between the microprocessor 209 and the system EPROM 210 are strictly read operations.

The slot card buffer bus SD is a secondary data bus used mainly for data transfers between the microprocessor data bus D and the slot cards. This bus is isolated from the microprocessor data bus by tri-state data selectors 301 in FIG. 3. The slot card bus buffers 301 are comprised of two type 74HCT257 quad 2-Line to 1-Line Data Selectors/Multiplexers. The block 301 represents the two devices, with prefixes of "1" and "2" respectively for the terminals. The select and enable terminals are connected in parallel and represented as single terminals, with the select terminals SEL connected to the address line A4, and the enable terminals EN connected to line EN. Half of the data inputs having a suffix of "0" are connected to the eight lines of the buffer bus SD, e.g. terminals 1DO, 1CO, 1BO, 1AO, 2DO, 2CO, 2BO & 2AO are connected respectively to lines SD0-7. The other half of the data terminals of the selectors are connected to ground for a logical zero, except for terminal 1D1 connected to line VER and terminal 2A1 connected to line DSO. The signal on line VER is the Interrupt Verify Signal from the slot cards and the signal on line DSO is a signal indicating the status of the doors in the lab.

The eight terminals 1YD-2YA of the data selector 301 are connected respectively to lines D0-D7 of the data bus D. The logic level on line A4 selects whether slot card data or status information will be routed to the microprocessor data bus D. When the signal on line A4 is high, the microprocessor is accessing either status information from the slot cards or the status of laboratory doors. When the signal on line A4 is low, the microprocessor is reading command data from the slot cards.

ADDRESS BUS DECODING

The address decoding scheme provides for a contiguous 64-kilobyte memory map in which all devices are assigned one or more addresses. The memory map is shown on page 12 of the referenced technical report. The memory map can be thought of as having three sections. The first section is the nonvolatile memory in the EPROM device 210 where the controller's operating system resides. The second section is the read/write memory (internal RAM) in the microprocessor 209 where temporary data are stored and where stack operations occur. The third section or the memory map is the I/O section, which includes all I/O to the lasers and shutters as well as the slot cards and the hardware reset signal.

In addition to the address lines, the microprocessor 209 uses three control signals when sending out a valid address. These three signals are the VMA signal, the R/$\overline{W}$, and the E clock. These signals are logic level active (i.e., not transition sensitive) and must be used when addressing devices on the processor's bus. The VMA signal is an active logic high signal when valid and indicates that there is a valid address on the address bus A. The R/$\overline{W}$ signal is a two-state signal which is high for a read operation and low for a write operation. The E clock signal provides the synchronization for each microprocessor operation.

The EPROM 210 is a type 2716 chip, which has 2K×8 bytes of nonvolatile storage capacity and is erasable using ultraviolet light. In addition to the address lines, there are two control lines, the chip enable pin 18 which is grounded in FIG. 2, and the output enable pin 20. Both of these signals are active low. When the output enable signal is driven low, the data lines D0-7 come out of the high impedance state and the data or instruction op-code that resides in the EPROM is placed on the data bus D. The output enable signal is produced by a NAND gate 206 having inputs from the signals VMA, R/$\overline{W}$, and E; and from the address lines A11, A12, A13, A14 & A15, which all must be logic high to generate the output enable signal. With A11-A15 being high, the allowable addressing range that will place the EPROM 210 in the active state is $F800 through $FFFF. The eleven address lines A0-A10 are connected respectively to the inputs A0-A10 of the EPROM.

The address decoding circuits for the I/O ports and the slot cards comprise an address comparator and two PROM units 207 and 208, along with a set of gates shown at the right in FIG. 2. The decoding scheme employs programmable read only memory devices 207 and 208, each of which is a type 74S288 PROM with 32 bytes of storage. The address lines A0-A4 of PROMs are connected respectively to the lowest five address lines A0-A4.

According to the system memory map, the I/O ports are in locations $0081 through $0084. In order to decode the control signals in the PROM 207 for these locations, the base address $0080 is decoded and used as the enable signal for the PROM. This decoding is performed by the 12-bit address comparator 211 (type 74HCT679) that is driven by the higher order address lines. The comparator's address inputs are connected to bus lines A5 through A15 of the address bus and the VMA line. The control input $\overline{G}$ is grounded. The comparator is programmed through the use of its control lines, with terminals P0 and P2 to ground and terminals P1 and P3 to +5 volts, to check for all logic lows on address lines A5, A6 and A8 through A15, and for logic highs on lines A7 and VMA. This occurs when the base address is $0800 and the VMA signal indicates that there is a valid address on the bus. When this condition occurs, the comparator 211 places a low at its output Y, which is connected to the $\overline{S}$ inputs of the PROMs 207 and 208 to enable their outputs. The address bus lines A0-A4 are connected respectively to the A0-A4 inputs of both of the PROMs. Although not shown in FIG. 2, each of the outputs of the PROMs 207 & 208 is connected via a pull-up resistor to +5 volts.

The decoded output data from the PROMs 207 and 208 is such that for unused addresses all output bits are high, and for other addresses all bits are high except for one, which is active low. For I/O decoding there are four addresses, each of which provides an active low on one of the outputs D5, D4, D3 and D2 from PROM 207. There is one address which provides a low signal on output D0 of PROM 207. For slot card decoding there are eight addresses which respectively provide an active low signals on one of the outputs D7-D0 of PROM 206, and each of these addresses also provides a low at the output D1 of PROM 207.

A set of gates combine the outputs from the PROMs 207 and 208 with the E clock and read-write signals from the microprocessor 209, with the E terminal connected to NAND gates 202a and 202b, and the R/$\overline{W}$ terminal connected directly to gate 202b and inverted via gate 202c to gate 202a. The output of gate 202a is connected to OR gates 203a, 203b and 203d, so that they have active low output on leads PA, PB and PD respectively during write cycles when the E clock is active. The output of gate 202b is connected to OR gate 203c, so that it has an active low output on lead PC during read cycles when the E clock is active. The output of gate 202b is also connected via an inverter 201d to a NAND gate 201d. The eight outputs of the PROM 208 are connected to a NAND gate 205, whose output is connected to gate 201d, so that during a read cycle when the E clock is active, and any one of the outputs of PROM 208 is active low, the signal from gate 201d on lead EN is active low. The bus D and the leads at the right hand side of FIG. 2 are connected via the jumper to the card of FIG. 3.

THE INPUT/OUTPUT PORTS

The input/output ports are a set of 8-bit latches, drivers and buffers that serve to transfer information between the shutter controller and the external world. The I/O ports serve to drive both the shutters and interlocks as well as the indicator lights that reflect the shutters' status. In addition the I/O ports provide the means to obtain feedback from the shutters to indicate if closure occurred at the proper.

The configuration of the I/O ports is shown in FIG. 3. The ports consist of three type DP8311 Octal Latch/Drivers 303, 304 and 306 and a type 74HCT541 Tri-state Octal Buffer 305. The latches provide for control of the interlocks, laser shutters and status lights while the octal buffer is the input port for determining the actual state of the shutters.

Each of the latch devices 303, 305 and 306 has eight data inputs D1-D8 connected respectively to the eight lines D0-D7 of the data bus D; and the buffer device 305 has eight outputs connected respectively to the eight lines D0-D7 of the data bus D. Control signals are provided on the leads PA-PD from the address decoders of FIG. 2. The signal on lead PA is an interlock latch control signal connected to the strobe input STR of the latches 303. The signal on lead PB is a shutter latch control signal connected to the strobe input STR of the latches 304. The signal on lead PC is a shutter state buffer read enable signal connected to the gate input G of the buffers 305. The signal on lead PD is a shutter latch control signal connected to the strobe input STR of the latches 306.

The latch device 303 has its eight outputs Q8-Q1 connected to windings of relays RY1-8, with the contacts of the relays connected via line 320 to the laser interlocks. The latch device 304 has its eight outputs Q8-Q1 connected to windings of relays RY9-16, with the contacts of the relays connected to line 321. These relays can be used to control programmable power supplies for driving shutters. The latch device has its eight outputs connected via line 322 to control LEDs that indicate whether the shutters are open or closed. Line 322 from the shutter status photo detectors are connected to the eight inputs A7-A0 of the buffers 305. During an emergency shutter closure, the microprocessor reads this buffer device to determine if the shutters actually closed and then takes appropriate action.

THE NON-MASKABLE INTERRUPT CIRCUIT

The non-maskable interrupt circuit is the heart of the safety features of the shutter controller. This circuit serves two critical functions. First, it unconditionally interrupts the system when a breach of the laboratory is detected. Second, it continuously monitors the entrances to the lab area in order to prevent the system from allowing shutters to open when the lab area is not secure.

As shown in FIG. 2, the circuit comprises two NAND gates 201b and 201c connected in a latch configuration with the output of each connected to an input of the other, an inverting gate 201a connected to an input of gate 201b, and two diodes 231 and 232 having their anodes connected to an input of gate 201c. The input of gate 201a is connected to terminal 220 and via a resistor to +5 volts. The output of gate 201c is connected to the noninterruptable input NMI at pin 6 of the microprocessor 209. When this signal is at logic low, the microprocessor is forced into a priority service routine. This routine closes all shutters, tests to ensure that all of the shutters did indeed close and then monitors the entrances to the lab to prevent any shutters from opening until the area is once again secure.

A second output from the circuit is the "door still open" line DSO which is connected to the output of gate 201a. The signal on this line is used to determine if the lab entrances are still open. A logic low on this line indicates that lab entrances are still unsecure and the microprocessor allow no further action to be take until all entrances are secure.

As shown in FIG. 1, the input at terminal 220 is connected to a series of normally closed magnetic reed switches that are located at the entrances of the lab, with a return to ground at terminal 221. An open lab entrance causes the signal at terminal 220 to go high, and the non-maskable circuit causes the microprocessor to take action.

Another two inputs to the circuit are reset inputs which are used to place the non-maskable interrupt circuit in an initial state. These two inputs are wired-OR to the same location in the circuit using the diodes 231 and 232. The common connection at the anodes of the two diodes is tied logic high via a pullup resistor to +5 volts so that either of the two inputs can cause resetting of the circuit.

THE SYSTEM RESET CIRCUIT

A system reset circuit is designed around a 74LS122 retriggerable monostable multivibrator (one shot) in FIG. 2. This circuit is responsible for bringing the laser shutter controller into an initialized operating state. This occurs automatically during power-up of the system or it can be initialized manually by an operator when required by pressing a switch shown in FIG. 1 connected between terminals 222 and 223. Reset is accomplished by holding a system reset pin (pin 40) of the microprocessor 209 low for a required time duration. This pin is connected via a system reset line to the $\overline{Q}$ terminal at pin 6 of the one shot device 212.

The one shot device 212 has four retriggerable inputs (A1, A2, B1, B2) with two of the inputs (B1, B2) having Schmitt trigger hysteresis. Upon power-up the one shot 212 is allowed to become stable before a reset is triggered, by driving the input B2 at pin 4 with an RC network, having a resistor and capacitor connected in series between +5 volts and ground, with pin 4 connected to the junction. This provides a wait time before sending a reset pulse to the system. Once the wait period has expired, the one shot 212 generates a pulse at its output for reset of the system.

A manual reset is initiated by causing a logic low from the switch at terminal 222 to appear at pin 3 (B1) of the one shot during normal operation. When activated, this will cause the one shot to generate a pulse, which will immediately cause the microprocessor 209 to halt operation and self-initialize.

In addition to initializing the microprocessor, the reset for the one shot 212 also via diode 231 initializes and temporarily inhibits the non-maskable interrupts. This is done to prevent contention between NMI and reset during the initialization. This also ensures that the NMI circuit is in a known state so that no valid laboratory breaches will be missed.

THE SLOT CARDS

To provide a versatile interface between the external lab environment and the laser shutter controller, a set of plug-in slot cards has been developed. These cards plug into the backplane wiring shown at the top of FIG. 1 and interface with the controller to allow the user to conveniently control the shutters and interlocks. These cards enable the user to open and close the shutters and interlocks through the use of push button switches, infrared remote controls and through computer interfaces.

Within the system, each slot card is an independent device. With limited exceptions, each card can be programmed to control any shutter or interlock attached to the laser shutter controller. In fact, more that one card can be legitimately configured to control the same shutter or interlock. In addition, the cards are interchangeable. Any card can be placed in any slot allowing the user to mix and match card types easily. This type of open-ended versatility provides the user with maximum flexibility to allow tailoring of the shutter controller to a specific lab environment.

All slot cards plugged into the system are in parallel. However, due to the tristate buffering scheme employed, only one card at a time is actively interfaced with the system. The parallelism of the slot cards allows all of the interrupt lines from all cards to be tied to the same interrupt line of the system. Each card has a common collector interrupt driver and they are all connected via line IRQ to the IRQ input at pin 4 of the microprocessor 209. At this input the lines are pulled to a logic high state by a 10,000 ohm resistor to +5 volts. Any card (and potentially more that one card at a time) can cause the signal on this line to go low requesting service from the processor. During an interrupt service, the Microprocessor polls each slot card, in turn, to determine which card is requesting service.

All slot cards have a connection to line VER for an interrupt verify signal, and a connection to line CLR to provide an interrupt clear signal. Line VER is coupled to line D0 of the data bus D via input 1D1 of the data selector 301 in FIG. 3. The interrupt verify signal is read by the system sequentially from lowest to highest slot to determine which card is interrupting the system. This signal becomes active on the microprocessor data bus when the specific address for a particular card is addressed by the microprocessor 209. The interrupt clear signal is generated by the system to clear a slot card after an interrupt has been serviced. While this signal appears in parallel to all of the slot cards, only the slot card whose specific address is being accessed sees the signal. This allows more than one card to send valid interrupts at the same time.

The hardware configuration present on all slot cards that allows each to be in parallel yet separate is the slot card interrupt priority switch. This switch consists of eight separate single-pole-single-throw (SPST) inputs, all tied together on one side. The microprocessor places a successive logic low on these SPST switches in order to activate the buffers isolating the two data buses. The key to isolation is to ensure that each of the slot cards has all but one unique SPST switch open. In effect, this allows the microprocessor to poll each successive slot, activating only one card at a time to service any interrupts.

For all eight potential slot cards, there are a total of 24 addresses that can access the cards. There are eight each for access, interrupt verification and interrupt clearing (3 for each slot). The slot cards request a specific action from the controller by providing an 8-bit command code during an interrupt request. These codes cause the controller to open or close individual shutters or interlocks or collectively open or close all shutters or interlocks. In addition, one code is provided to allow reset of the entire system from a slot card.

When a valid command is sent to the controller, a specific action is taken. In the case of a "local" command, the controller will perform a logical AND or of the current state of the shutters or interlocks with the proper bit pattern to effect the desired change. With "global" commands, the controller will simply write a bit pattern to the shutters or interlocks to open or close them all. In the case of a reset command, the system performs a branch to the beginning of the system monitor software.

The drawings show two types of cards that can be used with the laser shutter controller. The first is a manual switch card 400 that allows the user to open and close shutters (or interlocks) by means of push button switches placed in close proximity to the laser system. The second card is an infrared control card 500 that allows the user to open and close shutters via a hand held transmitter.

THE MANUAL SWITCH CARD

Figure 4:
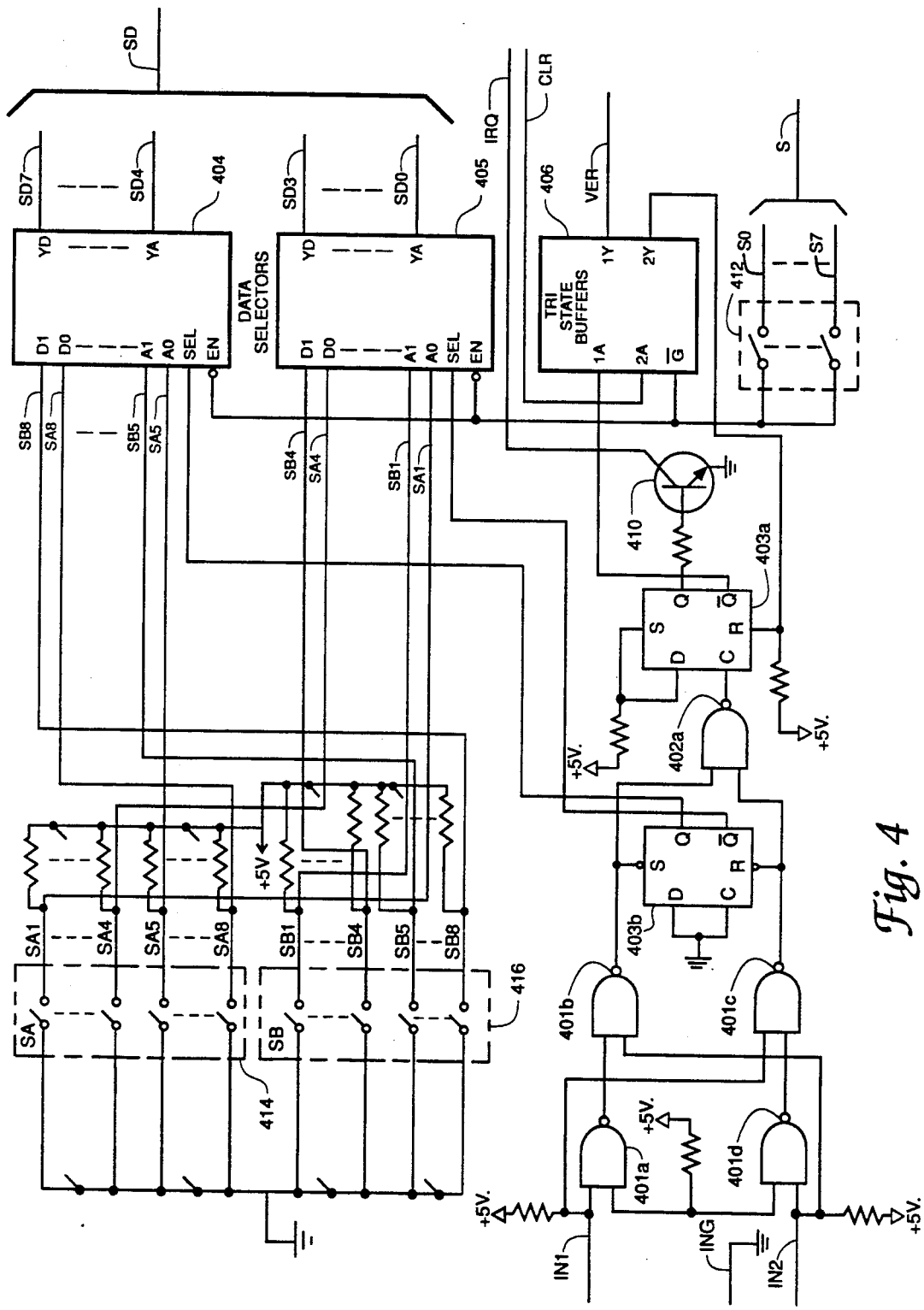
FIG. 4 is a functional block and schematic diagram of a manual switch slot card.

The schematic for the Manual Switch Card is shown in FIG. 4. The card has two inputs IN1 and IN2 for SPST switches that allow the user to send one of two code commands to the controller. In the most common configuration, pressing one switch will send a command to open a shutter and pressing the other switch will send a command to close a shutter.

On the card, two sets of DIP switches 414 and 416 allow the user to program which commands will be sent to the controller. While normally the two distinct commands to open and close a particular shutter are programmed using these switches, the user can choose any two commands (or for that matter any one command).

When used to control a shutter, the interface usually consists of a series of SPST switches placed around an optical table near the laser system. As shown in FIG. 1, half of these switches are in parallel and are connected from input IN1 to a ground terminal ING; and the other half are also in parallel connected from input IN2 to terminal ING. Pressing one switch opens a shutter, pressing the other closes a shutter. This provides the laser user with a convenient way to control the laser light when setting up or performing an experiment.

The input section of the manual switch card 400 is shown in the lower left portion of FIG. 4. With low logic level signals provided by the switches at inputs IN1 and IN2, the circuit provides a smooth transition between the selection of two command words. Input IN1 is connected via a resistor to +5 volts, to an input of a NAND gate 401a, and to an input of a NAND gate 401c. Input IN2 is connected via a resistor to +5 volts, to an input of a NAND gate 401d, and to an input of a NAND gate 401b. Gates 401a and 401d have inputs connected together to +5 volts, so that they act as inverters. The output of gate 401a is connected to a second input of gate 401b, and the output of gate 401d is connected to a second input of gate 401c. A NAND gate 402a has inputs connected respectively to outputs of gates 410b and 401c, and an output connected to the clock input of a D type 74HCT74 flip-flop 403a. The other half of the flip-flop chip is a flip-flop 403b having S and R inputs connected respectively to outputs of gates 401b and 401c. Flip-flop 403b has its D and C inputs grounded, and its Q and Q outputs connected respectively to the select inputs SEL of data selectors 404 and 405. Flip-flop 403a has its D and S inputs connected together via a resistor to +5 volts, its R input connected via a resistor to +5 volts, and also to the 2Y output of a tri-state buffer device 406. The Q output of flip-flop is connected via a resistor to the base of an NPN transistor 410, and it $\overline{Q}$ connected to the 1A input of the buffer device 406. The transistor 410 has its emitter grounded, and its collector connected to line IRQ.

When the switches pull either input IN1 or IN2 low, the set or reset lines of flip-flop 403b will go low respectively. This causes the Q and $\overline{Q}$ outputs of this flip-flop to toggle between logic states to select either one or the other command byte programmed into the card at the DIP switches 414 and 416. Regardless of which command word is selected, making either input IN1 or IN2 low will cause the output of NAND gate 402a to go high. This causes the flip-flop 403a to clock through the logic high at its D input to the Q output. This turns on the transistor 410 causing the interrupt line IRQ to the microprocessor to become active. In other words, each time either switch is pressed the circuit will select the proper command word and notify the system that a service is requested.

The remaining circuitry for the manual switch card 400 consists of the tri-state buffers 406 and multiplexers or data selectors 404 and 405 that transfer the command data and other signals between the card and the rest of the system. These tri-state devices are controlled by signals generated by the system in response to an interrupt generated by the manual switch card. The data inputs of the data selectors 404 and 405 are connected to the DIP switches 414 and 416 which are used to program the command words, and the outputs of these data selectors are connected to the bus SD. The enable inputs EN of the data selectors 404 and 405 and the gate input of the buffer unit 406 are connected to one side of eight switches on a DIP unit 412. Only one of the switches on this unit is closed to provide a connection to one of the eight lines S0–S7 of the slot card interrupt bus S. The interrupt clear line CLR is connected to input 2A of the buffer unit 406, and the output 2Y is connected to terminal R of flip-flop 403a.

THE INFRARED REMOTE CONTROL INTERFACE

The infrared (IR) remote control interface consists of the transmitter 600 and slot card receiver 500.

Figure 6:
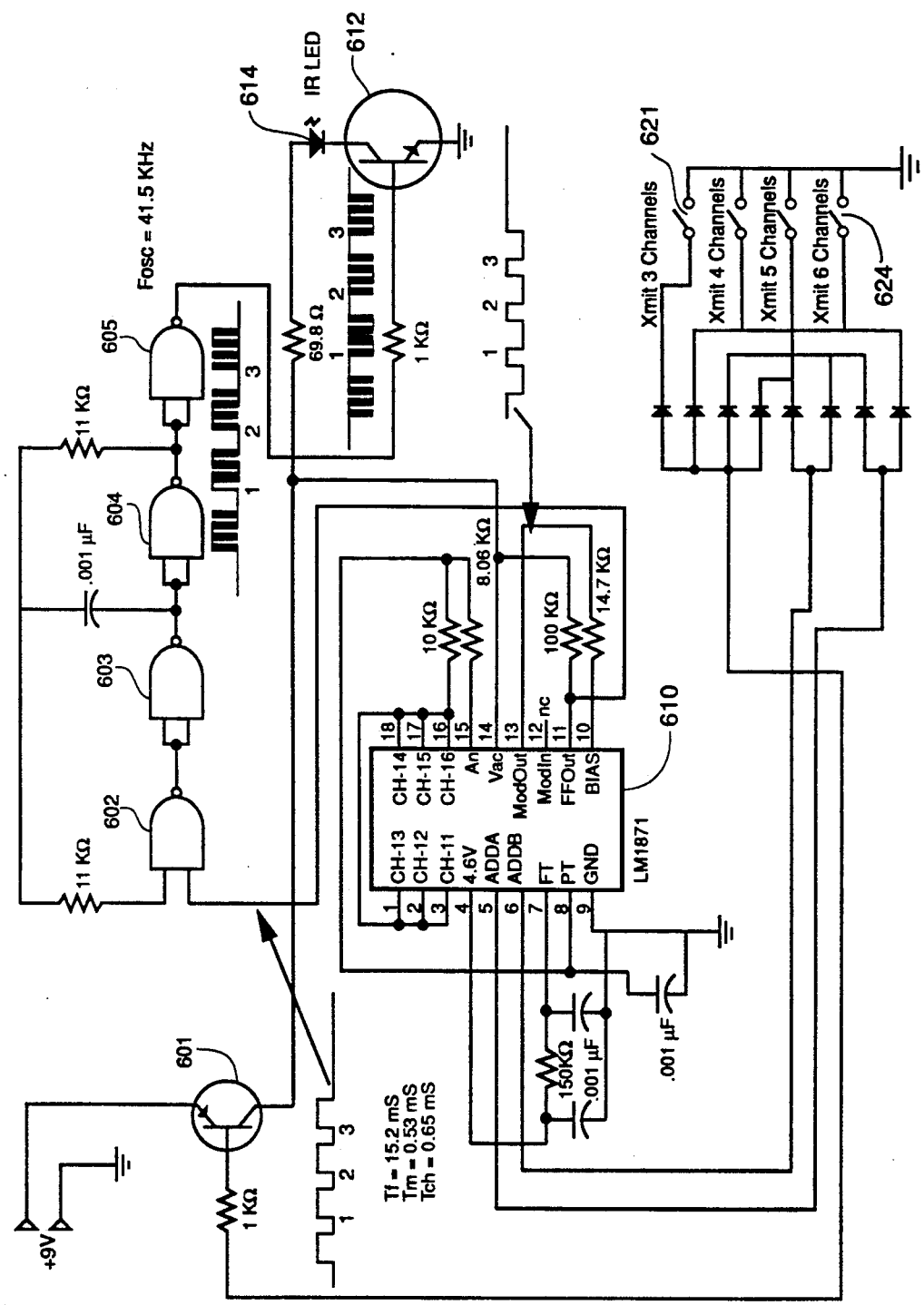
FIG. 6 is a functional block and schematic diagram of an IR transmitter used to control the circuit of FIG. 5.

The infrared transmitter 600 shown in FIG. 6 is designed around a National Semiconductor LM1871 RC Encoder/Transmitter integrated circuit 610. As used herein, the information is encoded in the number of transmitted pulses. The number of pulses may be 3, 4, 5 or 6, which may be used for control of two independent shutters on or off. The pulse number encoded information is interrupted carrier modulated (ICM) onto a 40-KHz carrier.

ICM modulation is accomplished by gating an oscillator on and off. The oscillator comprises four gates 602, 603, 604 and 605 in tandem with a capacitor and two resistors. The signal from the oscillator is applied to the base of an NPN transistor 612 which in turn drives an IR light emitting diode (IR LED).

Power from a 9-volt battery is supplied via a transistor 601 which is turned on only during transmission to conserve power. The transistor 601 is turned on only when one of the four command switches 621–624 is closed. The number of pulses to transmit and the application of power is controlled by an array of diodes connected to the command switches. The diodes act as an isolating logic interpreter for the switches performing the dual functions of encoding the command logic while isolating each switch from the others.

Figure 5:
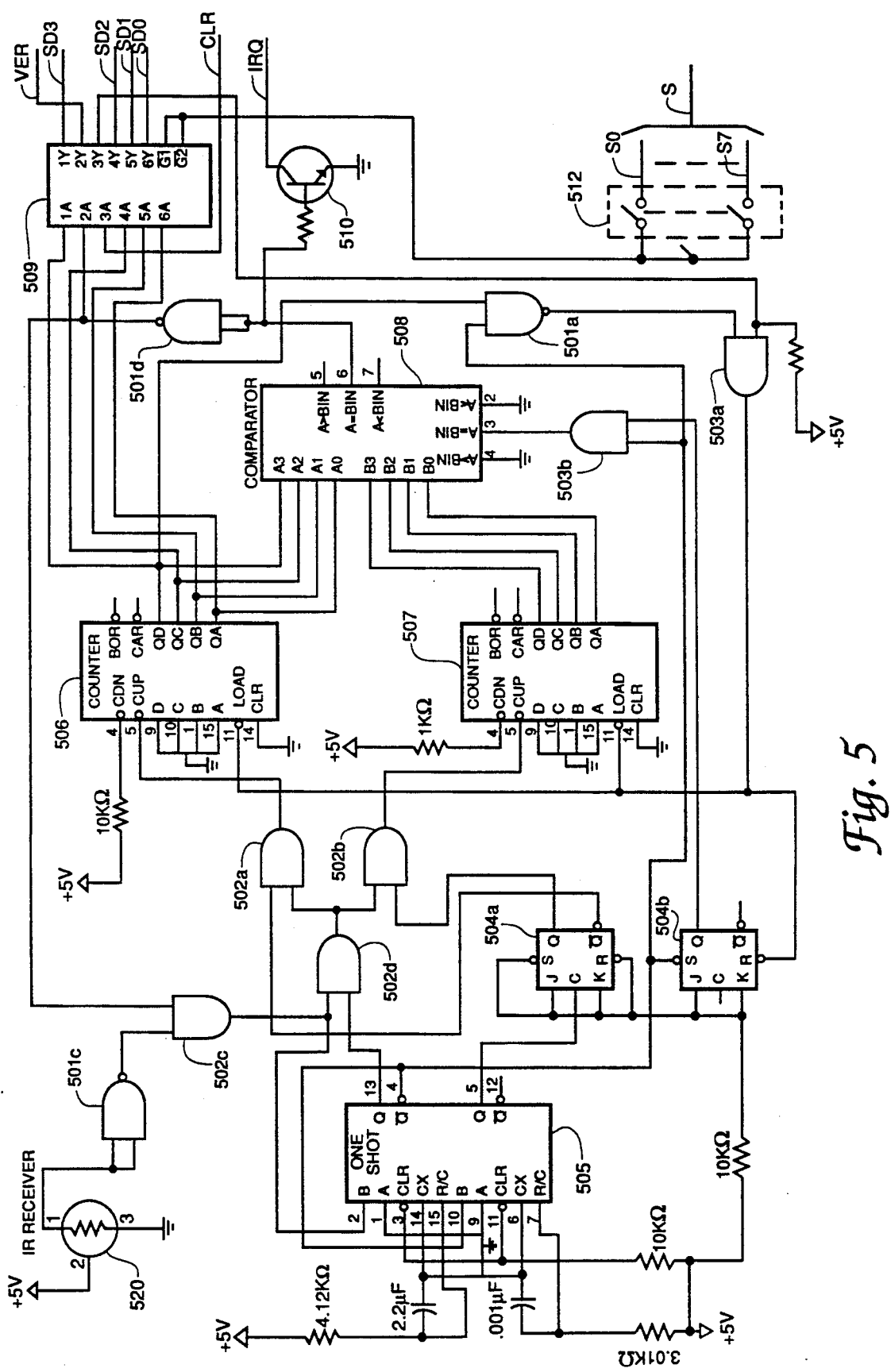
FIG. 5 is a functional block and schematic diagram of an IR remote decoder slot card.

The remote decoder slot card 500 shown in FIG. 5 serves as a receiver and interpreter for commands sent by the IR remote transmitter unit. This card performs two specific functions each time a command is detected from the transmitter. First, since the pulses coming from the transmitter are asynchronous, the receiver must first determine the beginning of a frame for a command. After the correct frame of reference is determined, the card must then ensure that the command being sent is of a valid nature. To ensure that the pulse train being counted is valid, two consecutive pulse trains must be received that have the same number of pulses in the valid range (4, 5, 6 or 7). In addition, valid incoming pulses are very regular in spacing and duration, so the remote decoder also uses this property to exclude spurious noise and ensure a valid signal.

To perform the required tasks for detection and decoding, the remote decoder card employs a series of digital timing and counting functions. At the heart of the decoder is a dual set of counters 506 and 507 (type 74HCT193) and a dual retriggerable one shot 505 (type 74123). The incoming signal is first detected and demodulated by an IR detector module 520 (type Sharp GP1U52X) to produce a series of TTL level pulses that can be counted. Upon receiving the first pulse of the train, the remote decoder via gates 501c and 502c starts one timer or device 505 that allows the pulse train to be routed to the counter 506. The first timer of device 505 is configured to produce a gating pulse at its Q output (pin 13) whose duration is about 3 ms. This duration is slightly longer than the duration of a valid pulse coming from the IR transmitter 600. As long as pulses coming into the remote decoder are at intervals shorter than the duration of this timer, they will be routed via gate 502a to the counter 506. If this does not to toggle which in turn causes any subsequent pulses to be routed via gate 502b to the second counter 507. This allows two consecutive commands to be received by the remote decoder 500, each being counted by a different counter. This toggling action goes back and forth first activating one counter and then the other for each train of pulses received. This interaction between pulses, the timer and the counters ensures that erratic or spurious signals will not be viewed as legitimate commands.

To determine when two consecutive pulse trains are equal, the remote decoder employs a 4-bit magnitude comparator 508 (type 74HCT85). After each complete pulse train is received, the contents of both counters are compared. If they are equal, the remote decoder card sends an interrupt request via transistor 510 and line IRQ to the shutter controller. At the same time, the gate input via gate 502c is disabled. This prevents any further commands from the IR transmitter from reaching the decoder card until the current interrupt is completed.

The rest of the circuitry on the remote decoder card 500 is essentially the same as on other slot cards. A tristate buffer system 509 interfaces to the shutter controller with an open collector interrupt driver. As with the other slot cards, the tristate bus is controlled by signals from the shutter controller.

SYSTEM SOFTWARE

Figure 7:
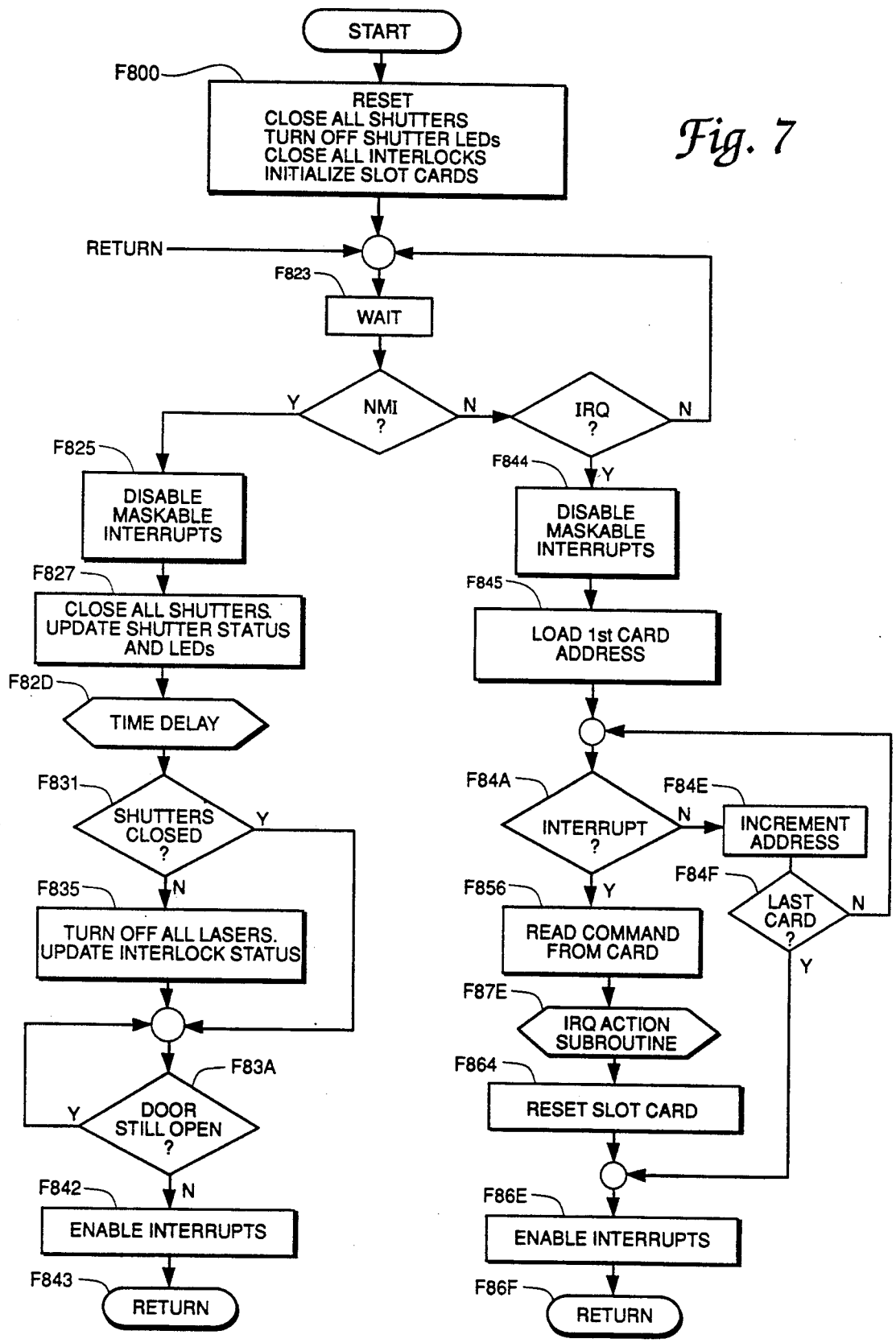
FIG. 7 is a flow chart of the program for the laser safety shutter controller.

The assembly language program listing may be found in the referenced technical report. FIG. 7 is a flowchart of the program. The blocks are identified with the first line of a section of program code.

RESET ROUTINE

Block F800 is the section of code which performs the initialization required to put the Shutter Controller in a known state. It first disables all maskable interrupts and sets the top of the microprocessor stack at the highest internal RAM location of the microprocessor 209. The stack is used for temporary storage when executing conditional branch instructions during system operation. It next ensures that all safety shutters are closed and that the indicator LEDs showing which shutters are open is also properly updated. In addition, a RAM location ($000B) is also updated with the current shutter status (i.e., all closed). This location is used throughout the monitor program for retrieving and updating the state of the shutters. The routine then in a similar fashion initializes and records the state of the laser interlocks. In this case, all interlocks are closed to allow any laser to be turned on. It then sends interrupt clear commands to all of the plug-in cards to initialize them to a known state. The actual data sent during these commands is irrelevant. Resetting is accomplished through hardware signals and only the address of the write command is important.

At block F823, the program finishes up the initialization by enabling maskable interrupts (CLI) and waiting for an interrupt. Inputs IRQ and NMI are hardware interrupt lines that are sampled when E is high and will start the interrupt routine on a low E following the completion of an instruction. This is represented in the flow chart by decision blocks NMI and IRQ, which are actually part of the wait state. Interrupt services return to line F823 after completion.

NON-MASKABLE INTERRUPT (NMI) ROUTINE

In response to a NMI interrupt, the program goes to the non-maskable interrupt routine, shown at the left side of the flow chart. This routine is invoked whenever the laser work environment is breached (i.e., a door is opened). At block F825 the program disables all maskable interrupts until completion of this routine. This does not, however, prevent the occurrence of another NMI.

At block F827 the routine will close all safety shutters and update the indicator LEDs and shutter status memory location. Block F82D then causes a branch to a Time Delay subroutine to allow time for the shutters to all close before testing their actual status. After the delay period is completed, block F831 checks to see if all of the shutters actually closed. If not, then safety is not ensured and the monitor program at block F835 turns off all of the lasers by opening their interlocks.

If the test in block F831 determines that all of the shutters actually closed, the normal execution continues at block F83A. A bit is tested that indicates if the branched opening is still there (i.e., the door to the lab is still open). The program will not allow any further operation until the breach is secured (i.e., the door is closed). It should be noted that this bit test is performed whether or not the shutters all closed or not. Once the breach is secured, the program enables maskable interrupts at block F842, and returns via block F843 for this interrupt routine to block F823.

INTERRUPT REQUEST (IRQ) ROUTINE

In response to a IRQ interrupt, the program goes to the interrupt request routine, shown at the right side of the flow chart, starting at block F844. This routine is invoked by the plug-in slot cards. Its function is to affect the shutters and interlocks according to the command byte sent by the plug-in slot cards. This routine provides a convenient way to open and close shutters and interlocks via external commands. These commands are 8-bit words programmed into the plug-in cards and are activated by the user through various means including push button switches, infrared remote control and computer command. Specifically, the IRQ routine takes the command and accesses an action table within the program and performs an operation (e.g., open a particular shutter) according to the code. The IRQ routine begins operation at block F844 by disabling further maskable interrupts. The routine at block F845 then loads the base address of the plug-in cards ($0090) in the index register and then begins testing each individual card to determine which one sent the interrupt. This is accomplished at block F84A by bit testing the least significant bit from the plug-in cards (the IRQ verify bit) and branching to block F856 when a logic zero is found. If this is not the card having an interrupt, the address is incremented at block F84E to test the next card, and a check is made at block F84F to see if all cards have been read, and if not the routine goes back to block F84A to check if this is the card having an interrupt. If no match is found for any slot, then the IRQ routine is exited from block F854 to block F86E. If a match is found, execution continues at block F856. This block F856 decrements the index register by eight and reads the actual command being sent by the plug-in card. During this process, the current value of the index register is stored for future use. Upon completion of this, the program branches to a IRQ action subroutine F87E where the action to the shutters/interlocks is taken. Upon return, the slot card address is incremented by 16 then reloaded into the index register and the interrupting slot card is reset at block F864. At block F86E the routine then enables maskable interrupts and returns from the interrupt via block F86F. It should be noted that each slot has three addresses, one for verifying an interrupt, one for reading the plug-in card command and one for resetting the card. These addresses can be found in the system memory map.

IRQ ACTION SUBROUTINE

This routine F87E is called by the Interrupt Request routine and affects change in the shutters/interlocks according to the command byte read from the interrupting plug-in card. This subroutine can open or close any individual shutter or interlock as well as open or close all shutters or interlocks. This subroutine can also reset the system when interpreting the proper command. This subroutine begins by loading the beginning address of the Action Table into the index register and storing it in locations $0010:$0011. The offset to this address is actually the command byte sent by the plug-in card, and this is added to the indexed address. There is no testing at this point to determine if the offset address is valid, but this will be done later. The first set of potential actions to be taken by this subroutine comprise a set of compares and branch-on-equals to determine if the command sent is to either open or close all shutters, open or close all interlocks or to reset the system. If the command sent is not one of these special case operations, then the command byte is tested to determine if it is any other valid command, and if not then the subroutine is terminated.

Once a valid command is detected, it is tested to determine if it is a shutter-service command or an interlock-service command. Once this is determined the least significant bit of the command is tested to determine if the command is a close command or an open command (either shutter or interlock). A logic 0 is a close command and a logic 1 is an open command. This test, along with the previous tests, determines the exact nature of the command and the appropriate action taken.

The two service routines, within this subroutine, are called INTSERV and SHUTSERV. Within these two service routines are open and close routines called OPENINT, CLOSEINT (for the interlocks), OPENSHUT and CLOSESHUT (for the shutters). These routines perform the actual shutter and interlock operations as well as updating temporary storage locations for shutter and interlock status and updating the shutter state indicator LEDs. Updating an actual interlock or shutter is done by fetching the appropriate mask word from the Action Table location addressed by the plug-in card command and either logical ANDing or ORing it with the current state of the shutters or interlocks. This method ensures that only the individual shutter or interlock in question is affected. After the correct action is taken and all status lights and/or status storage locations have been updated, the subroutine returns to the Interrupt Request routine at block F864.

It is understood that certain modifications to the invention as described, may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A controller for laser shutters and interlocks comprising a microprocessor, a read only memory in which a program is stored, a plurality of interface units, an address bus (A) having a number of address lines, a first data bus (D), a second data bus (SD), a unit select bus (S), first latch means having outputs coupled to interlock control lines and an input from a first control lines, second latch means having outputs coupled to shutter control lines and an input from a second control line, third latch means having output coupled to display control lines for status indicator means and an input from a third control line, the first, second, and third latch means each having inputs coupled to lines from shutter status detector lines and output to the first data bus, a fourth control line coupled to an input of the status buffer means, an interface interrupt line, a verify line, a clear signal line, an unsafe condition line (DSO);

wherein the microprocessor has a NMI (non-maskable interrupt) input, a IRQ (interrupt request) input coupled to the interface interrupt line, a reset input, outputs coupled to a set of addressing control lines, a set of address terminals coupled to the address bus, and a set of data terminals coupled to the first data bus;

wherein the read only memory includes a set of address inputs coupled to some of said address lines, a set of data outputs coupled to the first data bus, and enable terminal means; a memory address decode means having inputs coupled to some of said address lines and to said set of addressing control lines, the memory address decode means having an output coupled to the enable terminal means, so that the read only memory is addressed for a range of addresses for said program to supply instructions via the first data bus to the microprocessor;

peripheral address decode means having inputs from the address bus and from said set of addressing control lines, and outputs to said unit select bus, to said first, second, third and fourth control lines, to an enable line, to a safety interrupt reset line, and to the clear signal line;

data selector means having outputs to the first data bus, a first set of inputs from the second data bus, a second set of inputs from the verify line and the unsafe condition line, the enable line being coupled to an enable input of said data selector means, one of the address lies being coupled to a select input of the data selector means to select either the first set of inputs or the second set of inputs;

wherein each of said interface units includes data output means having outputs coupled to the second data bus, command means for selecting a command from user input means and for supplying signals encoding a selected command on inputs of the data output means, interrupt means coupled between the command means and the interface interrupt line for responding to the selection of a command to supply an interrupt signal, a verify buffer having an input from the interrupt means and an output coupled to the verify line, a clear signal buffer having an input from the clear signal line and an output to a clear means of the command means, and unit select means coupling the interrupt bus to the data output means to enable supplying the signals encoding a selected command to the second data bus, wherein the unit select means also enables the verify buffer and the clear signal buffer for verifying an interrupt and for clearing the interrupt means when a clear signal is received;

non-maskable interrupt means having interrupt latch means with an output to the NMI output of the microprocessor, an input coupled from a safety switch means to an input of the interrupt latch means and to the unsafe condition line, so that in response to a safety designating an unsafe condition from the safety switch means a signal showing an unsafe condition appears on the unsafe condition line and the interrupt latch means is set, means responsive to the interrupt latch means being set for causing the microprocessor to go to a non-maskable interrupt routine which generates an address to the peripheral address means and a write command to provide a strobe signal on the second control line to load the second latch means for a "close all shutters" condition, then generates an address to the peripheral address means to provide a strobe signal on the third control line and a write command to load the second latch means to update the shutter status, then generates an address to the peripheral address means to provide a strobe signal on the fourth control line and a read command to read the shutter status, which if the shutter status indicates that not all shutters are closed generates an address to the peripheral address means and a write command to provide a strobe signal on the first control line to load the first latch means for a "turn off all lasers" condition, which generates an address to monitor the unsafe condition line to prevent further operation until a signal on that line indicates a safe condition, then enables the microprocessor for further processing;

interrupt request means in the microprocessor responsive to an interrupt signal at the IRQ input to go to an interrupt request routine which addresses each interface unit in turn to determine which one is the interrupting interface unit by testing a bit on the first data bus from the verify line via the data selector means, reading a command sent from the interrupting interface unit via the second data bus and the data selector means, action means using the peripheral address means and data on the data bus to write command data to the first, second or third latch units, or to read data from the status buffer means, and reset means using the peripheral address means for addressing the interrupting interface unit and generating an active signal on the clear signal line, which is passed via the clear signal buffer of the addressed interface unit to reset the interrupt.

2. A controller according to claim 1, wherein said safety switch means comprises a set of door switches, and said signal shown an unsafe condition indicates an open door;

wherein at least one of said interface units is a manual unit wherein said means for selecting a command comprising a first bistable device, said user input means comprises first and second switch means coupled respectively to first and second inputs of the first bistable device so that activation of the first switch means sets the first bistable device to a first state and activation of the second switch means sets the second bistable device to a second state;

wherein said interrupt means of said manual unit comprises a second bistable device coupled to the first and second switch means so that activation of either the first or the second switch means sets the second bistable device to an active state, an output of the second bistable device being coupled to the interface interrupt line via an amplifying device;

wherein said means for supplying signals encoding a selected command to said manual unit comprises first and second sets of encoding devices which are set respectively for encoding first and second commands; and wherein said unit select means of said manual unit comprises interface data selector means having first and second sets of data inputs coupled respectively to the first and second sets of encoding devices and data outputs coupled to the second data bus, and select inputs coupled to the first bistable device so that the first or second set of data inputs is selected depending on the state of the first bistable device;

wherein the controller includes further a command transmitter, wherein at least one of said interface units is a remote decoder unit in which said user input means comprises the command transmitter, means coupling the command transmitter to the remote decoder unit, and means for originating commands at the command transmitter;

wherein said means for selecting a command of said remote decoder unit comprises means at the remote decoder unit for receiving commands from the command transmitter and means for storing the commands, and validation means for determining that a command is a valid command;

wherein said interrupt means of said remote decoder unit comprises an amplifying device having an input coupled to the validation means and an output coupled to the interface interrupt line;

wherein said means for supplying signals encoding a selected command of said remote decoder unit comprises first and second sets of encoding devices which are set respectively for encoding first and second commands; and wherein said unit select means of said remote decoder unit comprises means coupling the means for storing the commands to the second data bus.

3. A controller having safety switch means for laser shutters and interlocks, comprising a microprocessor, a read only memory in which a program is stored, a plurality of interface units, an address bus (A) having a number of address lines, a data bus (D), first latch means having outputs coupled to interlock control lines and an input from a first control line, second latch means having outputs coupled to shutter control lines and an input from a second control line, third latch means having outputs coupled to display control lines for status indicator means and an input from a third control line, the first, second and third latch means each having inputs from the data bus, status buffer means having inputs coupled to lines from shutter status detector lines and outputs to the data bus, a fourth control line coupled to an input of the status buffer means, an unsafe condition line (DSO);

wherein the microprocessor has a NMI (non-maskable interrupt) input, a reset input, outputs coupled to a set of addressing control lines, a set of address terminals coupled to the address bus, and a set of data terminals coupled to the data bus;

wherein the read only memory includes a set of address inputs coupled to some of said address lines, a set of data outputs coupled to the data bus, and enable terminal means; a memory address decode means having inputs coupled to some of said address lines and to said set of addressing control lines, the memory address decode means having an output coupled to the enable terminal means, so that the read only memory is addressed for a range of addresses for said program to supply instructions via the data bus to the microprocessor;

peripheral address decode means having inputs from the address bus and from said set of addressing control lines, and outputs to said unit select bus, to said first, second, third and fourth control lines, to a safety interrupt reset line;

non-maskable interrupt means having interrupt latch means with an output to the NMI input of the microprocessor, an input coupled from the safety switch means to an input of the interrupt latch means and to the unsafe condition line, so that in response to a signal designating an unsafe condition from the safety switch means a signal showing an unsafe condition appears on the unsafe condition line and the interrupt latch means is set, means responsive to the interrupt latch means being set for causing the microprocessor to go to a non-maskable interrupt routine which generates an address to the peripheral address means and a write command to provide a strobe signal on the second control line to load the second latch means for a "close all shutters" condition, then generates an address to the peripheral address means to provide a strobe signal on the third control line and a write command to load the second latch means to update the shutter status, then generates an address to the peripheral address means to provide a strobe signal on the fourth control line and a read command to read the shutter status, which if the shutter status indicates that not all shutters are closed generates an address to the peripheral address means and a write command to provide a strobe signal on the first control line to load the first latch means for a "turn off all lasers" condition, which generates an address to monitor the unsafe condition line to prevent further operation until a signal on that line indicates a safe condition, then enables the microprocessor for further processing.

4. A controller according to claim 3, wherein said safety switch means comprises a set of door switches, and said signal showing an unsafe condition indicates an open door.

5. A controller for laser shutters and interlocks, comprising a microprocessor, a read only memory in which a program is stored, a plurality of interface units, an address bus (A) having a number of address lines, a first data bus (D), a second data bus (SD), a unit select bus (S), first latch means having outputs coupled to interlock control lines and an input from a first control line, second latch means having outputs coupled to shutter control lines and an input from a second control line, third latch means having outputs coupled to display control lines for status indicator means and an input from a third control line, the first, second and third latch means each having inputs from the first data bus, status buffer means having inputs coupled to lines from shutter status detector lines and outputs to the first data bus, a fourth control line coupled to an input of the status buffer means, an interface interrupt line, a verify line, a clear signal line;

wherein the read only memory includes a set of address inputs coupled to some of said address lines, a set of data outputs coupled to the first data bus, and enable terminal means; a memory address decode means having inputs coupled to some of said address lines and to said set of addressing control lines, the memory address decode means having an output coupled to the enable terminal means, so that the read only memory is addressed for a range of addresses for said program to supply instructions via the first data bus to the microprocessor;

peripheral address decode means having inputs from the address bus and from said set of addressing control lines, and outputs to said unit select bus, to said first, second, third and fourth control lines, to an enable line, to a safety interrupt reset line, and to the clear signal line;

data selector means having outputs to the first data bus, a first set of inputs from the second data bus, a second set of inputs from the verify line and the unsafe condition line, the enable line being coupled to an enable input of said data selector means, one of the address lines being coupled to a select input of the data selector means to select either the first set of inputs or the second set of inputs;

wherein each of said interface units includes data output means having outputs coupled to the second data bus, command means comprising means for selecting a command from user input means and means for supplying signals encoding a selected command on inputs of the data output means, interrupt means coupled between the command means and the interface interrupt line for responding to the selection of a command to supply an interrupt signal, a verify buffer having an input from the interrupt means and an output coupled to the verify line, clear means for the command means, a clear signal buffer having an input from the clear signal line and an output to the clear means, and unit select means coupling the interrupt bus to the data output means to enable supplying the signal encoding a selected command to the second data bus, wherein the unit select means also enables the verify buffer and the clear signal buffer for verifying an interrupt and for clearing the interrupt means when a clear signal is received;

interrupt request means in the microprocessor responsive to an interrupt signal a the IRQ input to go to an interrupt request route which addresses each interface unit in turn to determine which one is the interrupting interface unit by testing a bit on the first data bus from the verify line via the data selector means, reading a command sent from the interrupting interface unit via the second data bus and the data selector means, action means using the peripheral address means and data on the data bus to write command data to the first, second and third latch units, or to read data from the status buffer means, and reset means using the peripheral address means for addressing the interrupting interface unit and generating an active signal on the clear signal line, which is passed via the clear signal buffer of the addressed interface unit to reset the interrupt.

6. A controller according to claim 5, wherein at least one of said interface units is a manual unit wherein said means for selecting a command comprises a first bistable device, said user input means comprises first and second switch means coupled respectively to first and second inputs of the first bistable device so that activation of the first switch means sets the first bistable device to a first state and activation of the second switch means sets the second bistable device to a second state;

wherein said interrupt means of said manual unit comprises a second bistable device coupled to the first and second switch means so that activation of either the first or the second switch means sets the second bistable device to an active state, an output of the second bistable device being coupled to the interface interrupt line via an amplifying device;

wherein said means for supplying signals encoding a selected command of said manual unit comprises first and second sets of encoding devices which are set respectively for encoding first and second commands; and wherein said unit select means of said manual unit comprises interface data selector means having first and second sets of data inputs coupled respectively to the first and second sets of encoding devices and data outputs coupled to the second data bus, and select inputs coupled to the first bistable device so that the first or second set of data inputs is selected depending on the state of the first bistable device.

7. A controller according to claim 5, further including a command transmitter, wherein at least one of said interface units is a remote decoder unit in which said user input means comprises the command transmitter, means coupling the command transmitter to the remote decoder unit, and means for originating commands at the command transmitter;

wherein said means for selecting a command of said remote decoder unit comprises means at the remote decoder unit for receiving commands from the command transmitter and means for storing the commands, and validation means for determining that a command is a valid command;

wherein said interrupt means of said remote decoder unit comprises an amplifying device having an input coupled to the validation mean and an output coupled to the interface interrupt line;

wherein said means for supplying signals encoding a selected command of said remote decoder unit comprises first and second sets of encoding devices which are set respectively for encoding first and second commands; and wherein said unit select means of said remote decoder unit comprises means coupling the means for storing the commands to the second data bus.

* * * * *

UNITED STATES PATENT AND TRADEMARK OFFICE
CERTIFICATE OF CORRECTION

| | | |
|---|---|---|
| PATENT NO. | : | 5,301,347 |
| DATED | : | April 5, 1994 |
| INVENTOR(S) | : | E. Thomas Kensky |

It is certified that error appears in the above-identified patent and that said Letters Patent is hereby corrected as shown below:

Column 12, line 68 the second occurrence of "Q" should be --$\overline{Q}$--.

Column 14, line 42, after "not" insert --occur, the timer 505 will time out. This causes a flip-flop 504a--.

Column 17, line 57, after "inputs" insert --from the first data bus, status buffer means having inputs--.

Column 17, line 58, change "output" to --outputs--.

Column 18, line 23, change "lies" to --lines--.

Column 18, line 47, change the second occurrence of "output" to --input--.

Column 18, line 51, change "safety" to --signal--.

Column 19, line 30, change "shown" to --showing--.

Column 22, line 16, change "signal" to --signals--.

Column 22, line 24, change "route" to --routine--.

Signed and Sealed this

Eighth Day of November, 1994

Attest:

BRUCE LEHMAN

*Attesting Officer*   *Commissioner of Patents and Trademarks*